United States Patent [19]

Yokobayashi

[11] Patent Number: 5,290,506
[45] Date of Patent: Mar. 1, 1994

[54] PROCESS OF INJECTION STRETCH BLOW MOLDING HOLLOW ARTICLE HAVING THICK-WALLED BOTTOM

[75] Inventor: Kazuyuki Yokobayashi, Ueda, Japan

[73] Assignee: Nissei ASB Machine Co., Ltd., Nagano, Japan

[21] Appl. No.: 872,321

[22] Filed: Apr. 23, 1992

[30] Foreign Application Priority Data

Apr. 30, 1991 [JP] Japan .................. 3-126782

[51] Int. Cl.⁵ .................. B29C 49/12; B29C 49/64
[52] U.S. Cl. .................. 264/520; 264/528; 264/529; 264/532; 425/526; 425/529
[58] Field of Search .......... 264/532, 520, 521, 528, 264/529; 425/526, 529

[56] References Cited

U.S. PATENT DOCUMENTS

| | | | |
|---|---|---|---|
| 4,020,137 | 4/1977 | Lachner et al. | 264/520 |
| 4,199,629 | 4/1980 | Agrawal et al. | 428/35 |
| 4,422,843 | 12/1983 | Aoki | 264/532 |
| 4,473,515 | 9/1984 | Ryder | 264/520 |
| 4,615,667 | 10/1986 | Roy | 264/532 |
| 4,780,257 | 10/1988 | Beck | 264/532 |

FOREIGN PATENT DOCUMENTS

| | | | |
|---|---|---|---|
| 1816489 | 8/1970 | Fed. Rep. of Germany | 264/521 |
| 2059917 | 5/1971 | France . | |
| 47-1118 | 1/1972 | Japan | 425/526 |
| 50-13829 | 5/1975 | Japan . | |
| 58-29632 | 2/1983 | Japan | 264/532 |
| 58-56828 | 4/1983 | Japan . | |
| 59-138419 | 8/1984 | Japan | 264/532 |
| 63-207629 | 8/1988 | Japan | 425/526 |
| 64-5815 | 1/1989 | Japan . | |
| 2-128826 | 5/1990 | Japan . | |
| 2137921 | 10/1984 | United Kingdom . | |

OTHER PUBLICATIONS

Patent Abstracts of Japan, vol. 10, No. 21, Jan. 28, 1986.
Patent Abstracts of Japan, vol. 6, No. 213, Oct. 26, 1982.
Patent Abstracts of Japan, vol. 7, No. 145, Jun. 24, 1983.

*Primary Examiner*—Catherine Timm
*Attorney, Agent, or Firm*—Oliff Berridge

[57] ABSTRACT

An injection stretch blow molding process forms a hollow article having a thick-walled bottom wall by regulating the bottom region of an injection molded preform to a temperature lower than that of a barrel preform portion at a blow molding station. In the process, a bulged portion formed on the distal end of a stretching rod and regulated in temperature is brought into contact with the inner bottom and adjacent side walls of the preform which correspond to the bottom region of the hollow article to be formed into an increased wall thickness, before start of a biaxially stretch blow molding step wherein the preform having a potential heat provided in the injection molding step is biaxially stretched to form the hollow article. The region of the preform contacting the bulged end portion has a temperature lower than another region of the preform non-contacting the bulged end portion.

21 Claims, 10 Drawing Sheets

PROCESS OF INJECTION STRETCH BLOW MOLDING HOLLOW ARTICLE HAVING THICK-WALLED BOTTOM

BACKGROUND OF THE INVENTION

1. Field of the Invention

The present invention relates to a process of injection stretch blow molding a hollow article having a thick-walled bottom, such as a refillable and returnable bottle (hereinafter called "R-R bottle") or pressure vessel subjected to an internal pressure from a carbonated beverage contained therein.

2. Description of the Related Art

R-R bottles have been developed to meet requirements in the reuse of resources and can be repeatedly used. The used R-R bottles are washed with caustic soda at a raised temperature and subjected to various tests such as a heat stability test at about 38 degrees C. or the like. If the bottom walls of the R-R bottles are too thin, they cannot withstand a predetermined number of repeated uses due to cracking or crazing. On the other hand, a pressure vessel subjected to the internal pressure generally has its inwardly concave bottom wall which is known as a champagne bottle's bottom. If the bottom wall of such a pressure vessel is too thin, the bottom wall may be undesirably deformed to be outwardly concave under the internal pressure of the pressure vessel. It is thus required in the art that the bottom walls of such bottles and/or vessels are larger in wall-thickness than those of the barrel portions.

In general, such a bottle having its thick-walled bottom may be molded by controlling the wall thickness of a preform and also the temperature condition in the preform. In the hot parison system wherein a preform (parison) maintaining heat applied thereto on the injection molding step is biaxially stretch blow molded, however, the wall-thickness and temperature condition must be experientally determined. This renders the design of the pressure bottle and/or vessel very difficult since the champagne bottle's bottom may be too thin or since the bottle bottom may have crater-shaped thick wall portions when the preform is caused to have an excessive wall thickness.

The provision of thick-walled bottom to a vessel or bottle has been proposed, for example, in Japanese Patent Laid-Open No. Sho 64-5815 or Japanese Patent Laid-Open No. Hei 2-128826.

In these prior techniques, a preform has a barrel portion and a bottom wall, the barrel portion having a thick-walled part at a position near the bottom wall of the preform. The thick-walled part of the barrel portion is formed, at its inner and top wall, with a step, a taper or a projection which is adapted to engage the distal end of a stretching rod mechanically. When the stretching rod engages the step, the taper or the projection of the barrel portion, said thick-walled part of the barrel portion near the bottom wall of the preform is less subjected to the longitudinal stretching force from the stretching rod. Thus, the longitudinal stretching operation can be performed while maintaining the longitudinal stretching force acting on the upper region of the preform larger (see FIGS. 9, 17 and 18 of Japanese Patent Laid-Open No. Sho 64-5815 and FIG. 7 of Japanese Patent Laid-Open No. Hei 2-128826). Thus, the thick-walled part of the barrel portion adjacent the bottom wall of the preform can be maintained at a wall thickness substantially equal to that provided on the injection molding step substantially immediately before the end of the longitudinal stretching step while the remaining parts are being stretched. A blow air (secondary blow air in Japanese Patent Laid-Open No. Hei 2-128826) is thereafter introduced into the preform to stretch the thick-walled barrel part into engagement with the inner wall of the blow mold. The thick-walled barrel part adjacent the bottom wall can be formed into a wall thickness larger than that of the upper barrel part.

One of the techniques relating to the present invention is disclosed in Japanese Patent Publication No. Sho 50-13829 which describes a technique of regulating the temperature of a preform to be stretch blow molded, although it does not aim to mold the thick-walled bottom of a bottle. This technique regulates the temperature of a preform bottom such that it will not be penetrated by the stretching rod while the latter is in contact with the inner bottom wall of the preform, in a re-heating step before the injection molded preform is moved to the blow molding stage. Such a technique is an early developed temperature regulating system for hot parison, in which the entire preform is regulated uniformly to a temperature suitable in stretching to secure a desirable distribution of temperature along the longitudinal axis of the preform (i.e. lower temperature at the bottom wall) such that the bottom of the preform will not be penetrated by the stretching rod.

In the molding techniques disclosed in the aforementioned Japanese Patent Laid-Open No. Sho 64-5815 and Japanese Patent Laid-Open No. Hei 2-128826, a preform having a specific configuration in which a thick-walled part is formed in the barrel portion of the preform at a position adjacent to the bottom wall of the preform and in which the preform has a rapid transition in wall thickness between said thick-walled part and the remaining parts of the barrel portion must be injection molded. This renders the workability of the injection mold and particularly the core rod difficult. Furthermore, it is very difficult not only to set various conditions on injection molding such a preform, but also to regulate the temperature of the preform before blow molding. It is particularly rare that a desired wall thickness in the bottom of a bottle is obtained as the design. The control of wall thickness must be attained by re-setting the injection conditions in accordance with changes in the core rod. Such an operation is extremely cumbersome. On the other hand, the process of biaxially stretch blow molding a preform into a bottle has an inherent temperature suitable in stretching, at which the portion below the neck portion has generally a temperature higher than that of the bottom portion. Where the barrel wall portion of the preform at a position adjacent to the bottom wall portion is thick-walled, the thick-walled barrel part has its increased heat capacity which will maintain a level of temperature given by the injection molding step higher. It is thus very difficult to regulate the temperature of the thick-walled bottom part to a reduced level. In order to regulate the temperature of the aforementioned preform having its specific configuration, it must be secured that the bottom wall part having its increased heat capacity is regulated to a lower temperature while the thin-walled barrel part having its decreased heat capacity is regulated to a higher temperature.

The aforementioned Japanese Patent Laid-Open No. Sho 64-5815 and Japanese Patent Laid-Open No. Hei 2-128826 do not disclose the control of temperature on a specific preform at all. In order to realize the above technique, however, it is essential to accomplish a difficult goal that the specific preform can be regulated into an appropriate temperature for stretching.

The aforementioned Japanese Patent Publication No. Sho 50-13829 discloses a technique of regulating the temperature of the bottom preform wall by the use of a stretching rod at the reheating step different from the blow molding step. However, this technique does not teach and suggest that the bottom wall of a bottle should be maintained at a desirable wall thickness, but only describes the use of a stretching rod contacted by the inner bottom wall of the preform to regulate the temperature thereof. This is probably sufficient to prevent any penetration of the bottom preform wall by the stretching rod. It is, however, apparent that the wall thickness of the final product will be adversely affected by changes in temperature between the reheating step and the blow molding step and yet that the desired wall thickness at the bottom wall required in R-R bottles and the like cannot be secured only by regulating the temperature of the inner bottom wall of the preform.

SUMMARY OF THE INVENTION

It is therefore an object of the present invention to provide an injection stretch blow molding process which can reliably ensure a hollow article having a desired thick-walled part which is higher in mechanical strength.

Another object of the present invention is to provide an injection stretch blow molding process which can stably form a hollow article having a bottom wall of a wall thickness as the design by regulating the temperature of a portion adjacent to the bottom wall in the blow molding station.

To this end, the present invention provides a process for injection stretch blow molding a hollow article having a thick-walled bottom, the process comprising the steps of:

injection molding a preform in the form of a closed-end cylinder in an injection molding station;

moving said preform to a blow molding station wherein said preform is placed within a blow cavity mold while said preform still retains a heat provided thereto by the injection molding step;

regulating the temperature of a distal bulged end portion of a stretching rod inserted into said preform and bringing said distal bulged end portion into contact with the inner bottom and side wall of said preform corresponding to the thick-walled bottom region of said hollow article thereby regulating the temperature at the bottom region contacting with said distal bulged end portion into a level lower than that of the other region of said preform; and biaxially stretch blow molding said preform into said hollow article by blowing a pressurized fluid into said preform and also by driving said stretching rod.

In order to form the bottom wall of the final molding into a desired wall thickness, the process of the present invention brings the distal bulged end of the stretching rod into contact with the inner bottom wall of the preform. This promotes a direct heat exchange between the mutually contacting parts. If the distal bulged end of the stretching rod has been previously regulated into a preselected temperature, the bottom region of the preform contacting the distal bulged end can be regulated into a temperature lower than that of the other part of the preform non-contacting the stretching rod. In addition, the temperature regulating step can be carried out until immediately before and/or during the blow molding step of the preform. Therefore, the process of the present invention can ensure the desired wall thickness at the bottom region of the hollow product by controlling the temperature thereof more accurately than the prior art where the temperature of the preform would be varied when it was moved from the temperature regulating step to the biaxially stretch blow molding step. The molding resin material tends to be stretched more easily as the potential heat increases. The bottom preform region regulated into a relatively low temperature by the distal bulged end of the stretching rod will be less stretched than the barrel portion above the bottom region of the preform. As a result, the wall thickness of the bottom preform region can be maintained constant from the initiation to the termination of the stretching step. Since the wall thickness can be ensured within a region of the bottom preform wall contacting the distal bulged end of the stretching rod, the final product can have its bottom region having a wall thickness maintained as the design. By locally regulating the temperature of the bottom preform region until immediately before the blow molding step, the condition of temperature regulating at each step can be stabilized to form hollow products with less variability.

In the molding step after the temperature regulating step, the primary blow air is preferably introduced into the interior of the preform after the stretching rod has initiated to stretch the preform along its longitudinal axis. The pressure of the primary blow air is relatively low. Thus, the primary blow air is less blown into between the bulged end of the stretching rod and the bottom region of the preform contacting the bulged end. The wall thickness of this bottom preform region can be maintained constant until immediately before the termination of the stretching operation. The introduction of the primary blow air stretches the other region of the preform than the bottom region in the transverse direction to complete the shaping of the final product except the bottom region thereof. On the end of the transversely stretching step by the primary blow air, a part of the preform region which has originally contacted the bulged end of the stretching rod may be also stretched in the transverse direction and separated from the bulged end of the stretching rod. Since such an elongation is smaller than that of the other preform region, the wall thickness therein can be still maintained relatively constant.

Thereafter, the secondary blow air having a pressure higher than the primary blow air is introduced into the interior of the preform. Air is more blown into between the bulged end of the stretching rod and the preform region contacting the bulged end. The thick-walled bottom region of the preform will be stretched by the secondary blow air to form the complete shape of the final product. Since such an elongation at the thick-walled bottom region of the preform is relatively small, the wall thickness in the bottom wall of the final product can be maintained relatively thick. This provides the wall thickness of the bottom wall required in producing R-R bottles and other pressure vessels.

In order to ensure that the wall thickness of the preform bottom is substantially maintained immediately before the end of the longitudinally stretching step, the stretching rod may be driven a predetermined distance along the longitudinal axis to bring the bulged end thereof into close contact with the bottom region of the preform before the preform is stretched by the stretching rod in the longitudinal direction. If such a condition is maintained for a predetermined time period, the bottom region of the preform can be locally regulated in temperature. The temperature of the bulged end of the stretching rod can be more accurately controlled when a temperature regulating medium is circulated through the stretching rod.

Preforms usable in the process of the present invention may be of a simple configuration which comprises a neck portion, a barrel portion and a bottom portion, the wall thickness of the barrel portion being substantially uniform along the longitudinal axis without any rapid transition. Such preforms can extremely facilitate to set the conditions of working the core rod and injecting the material. If it is desired to regulate the preform into a temperature suitable for stretching, the desired distribution of temperature can be easily accomplished since the barrel portion of the preform has a substantially uniform wall thickness.

The blow cavity mold usable in the present invention may include any suitable heating means for heating the inner cavity wall thereof to a desired temperature. In such a case, a hollow article molded in the blow cavity mold can be heat set to improve the hollow article in heat-resistance. After the heat setting has been done and before the mold is opened, a cooling medium may be preferably introduced into the interior of the hollow article through the stretching rod. If the heated hollow article is not sufficiently cooled, it tends to be distorted on removing the product from the mold.

DETAILED DESCRIPTION OF THE PREFERRED EMBODIMENTS

Prior to the detailed description of some preferred embodiments of the present invention, a preform usable in the process of the present invention and a final bottle-shaped product molded according to this process will be described with reference to FIGS. 8A and 8B.

The preform is in the form of a closed-end cylinder generally denoted 10. The preform 10 comprises a neck portion 12 formed therein adjacent to the opened end thereof, a barrel portion 16 connected to the neck portion 12 through a shoulder portion 14, and a closed bottom portion 18 connected to the barrel portion 16. The preform 10 does not have any specific distribution of wall thickness. The shoulder portion 14 is reduced in wall thickness as it goes to the neck portion 12 while the barrel portion 16 has a substantially uniform wall thickness in the axial direction. The wall thickness of the bottom portion 18 is smaller than that of the barrel portion 16.

The preform 10 can be biaxially oriented to provide a bottle 20 which comprises a neck portion 22 not substantially stretched and having substantially the same shape as that of the neck portion 12 of the preform 10, a barrel portion 24 and a bottom portion 26. The barrel and bottom portions 24, 26 are biaxially oriented. The bottom portion 26 is in the form of a champagne's bottle bottom required in manufacturing R-R bottles and other pressure vessels and has specifically important parts, that is, a slant wall part 30 having a wall thickness $T_1$, a self-standing bottom ring part 32 having a wall thickness $T_2$ and a lower side barrel wall part 34 having a wall thickness $T_3$ and having a preselected height as measured from the self-standing bottom ring part 32.

After injection molding, the preform 10 is moved to a temperature regulating stage, if necessary. In the temperature regulating stage, the preform 10 is given a distribution of temperature suitable for stretching. More particularly, the distribution of temperature is such that the temperature of the shoulder portion 14 is higher than that of the bottom portion 18. This may be accomplished as by the use of temperature regulating pot and regulating core. After being regulated in temperature, the preform 10 is moved to a biaxially stretch blow molding stage shown in FIG. 1, in which the preform is stretch blow molded into the shape of the bottle 20.

Figure 1:
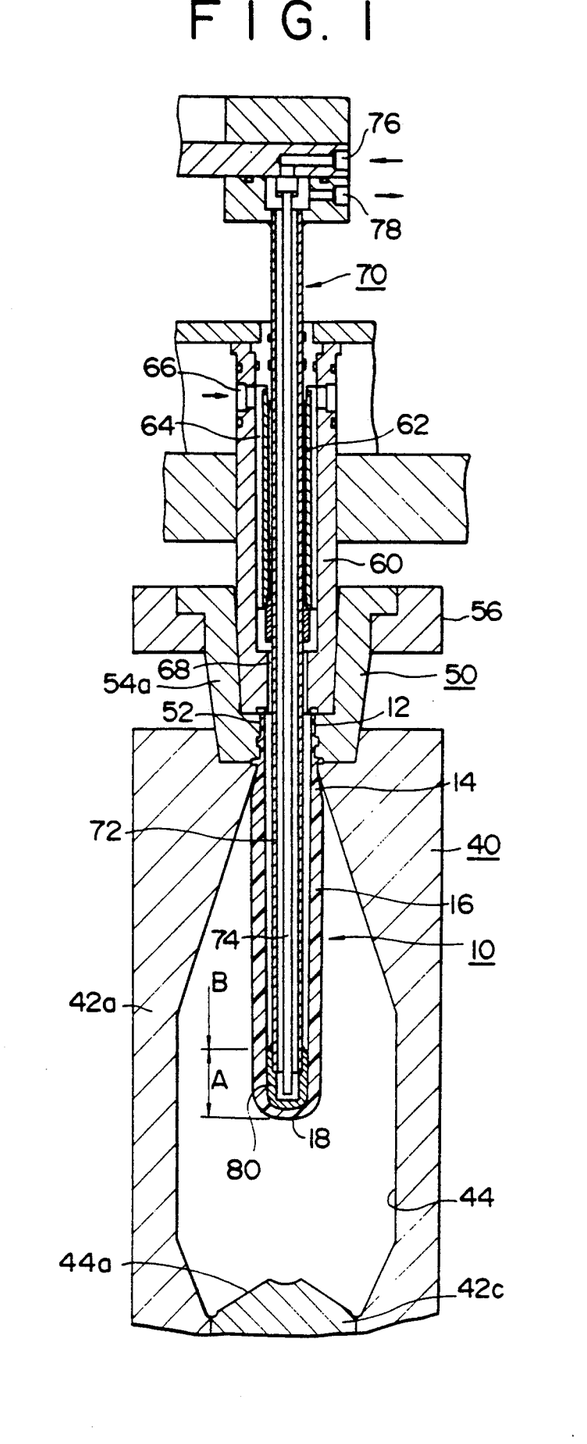
FIG. 1 is a schematic cross-section of one embodiment of a biaxially stretch blow molding apparatus usable in carrying out the process of the present invention.

The biaxially stretch blow molding step which is one feature of the present invention will be described in detail with reference to FIG. 1.

A mold assembly usable in this step generally comprises a blow cavity mold 40, a neck mold 50, a blow core 60 and a stretching rod 70. The blow cavity mold 40 is of a split type which comprises a pair of split mold sections 42a and 42b (the latter being not shown) movable toward or away from each other in a plane perpendicular to the plane of FIG. 1, and a vertically movable bottom mold section 42c. These mold sections are adapted to define a mold cavity 44 corresponding to the outline of the bottle 20 shown in FIG. 8B. The bottom mold section 42c includes an inwardly convex bottom cavity surface 44a corresponding to the shape of the bottom portion 26 of the bottle 20.

The neck mold 50 is adapted to hold the neck portion 12 of the preform 10 and also function as a neck cavity mold used in the injection molding step in the hot parison system as in the present embodiment. The neck mold 50 has a cavity surface 52 corresponding to the outline of the neck portion 12 of the preform 10. The neck mold 50 comprises a pair of split mold halves 54a and 54b (the latter being not shown) movable toward or away from each other in a plane perpendicular to the plane of FIG. 1 such that the neck mold 50 can be ejected after the bottle 20 has been molded. The split mold halves 54a and 54b are supported on a neck mold mounting plate 56 such that they can be opened and closed. In this embodiment, the blow cavity mold 40 is invariable in height, but the neck mold 50 is vertically moved by the vertical movement of the neck mold mounting plate 56 while holding the preform 10 or bottle 20. Thus, the preform 10 can be placed within the blow cavity mold 40 or the molded bottle 20 can be removed from the blow cavity mold 40.

The blow core 60 is used to introduce a blow air into the interior of the preform 10 through the neck portion 12 on clamping. The blow core 60 is of a concentrically doubled tube structure which comprises an inner passage 62 for receiving the stretching rod 70 (which will be referred to "rod passage") and an outer air passage 64. The top end of the air passage 64 is connected to an air inlet port 66 while the bottom end thereof is provided with an air outlet port 68 communicating with the opening of the neck portion 12 of the preform 10 on clamping. The air inlet port 66 can be alternately connected to a source of primary air used in the stretch blow molding step and to a source of secondary air having a pressure higher than that of the primary air. After the bottle 20 has been molded, the air inlet port 66 may be connected to an exhaust passage.

The stretching rod 70 is of a concentrically doubled tube structure comprising an outer tube 72 which may be made of aluminum and an inner tube 74 which may be made of nylon. The top end of the outer tube 72 is connected to an inlet 76 for receiving a temperature regulating medium such as water. An annular passage between the inner and outer tubes 74, 72 is connected, at the top end, to a water outlet 78. The distal end of the stretching rod 70 includes a bulged portion 80 formed therein which has a diameter larger than the external diameter of the outer tube 72. The bulged end portion 80 functions as a stretching mandrel as in the conventional stretching rod and also as a temperature regulating rod for controlling the temperature of the bottom portion 18 of the preform 10 when the bulged end portion 80 is in contact with the bottom portion 18. It is thus desirable that the bulged portion 80 is made of a metallic material having a good heat conductivity. Referring to FIG. 9, the bulged portion 80 has its external diameter $D_2$ slightly (e.g. 0.1 mm) smaller than the minimum internal diameter $D_1$ of the bottom preform portion 18 shown in FIG. 8A. On clamping, thus, the bulged end portion 80 can be smoothly inserted into the interior of the preform 10.

Prior to the biaxially stretch blow molding step, the bulged end portion 80 is brought into contact with the inner wall of the bottom preform portion 18 to regulate the temperature thereof. For such a purpose, the stretching rod 70 is excessively moved by a given distance after the stretching rod reaches the inner bottom wall of the preform 10. As a result, the internal diameter of the bottom preform portion 18 can be reduced to be brought into close contact with the bulged end portion 80. As shown in FIG. 9, the expanded length $L_2$ of the bulged end portion 80 along its profile is determined to correspond to the expanded length $L_1$ of the region to be formed into a thick-walled portion in the bottom bottle portion 26 shown in FIG. 8B.

The process of the present invention for molding the bottle 20 will be described below.

Injection Molding Step for Preform 10

Figure 8A:
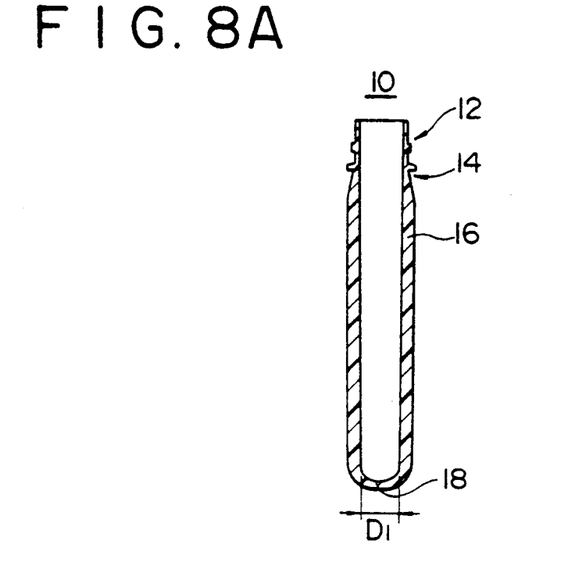
FIG. 8A is a schematic cross-section of a preform usable in the apparatus of FIG. 1.
Figure 9:
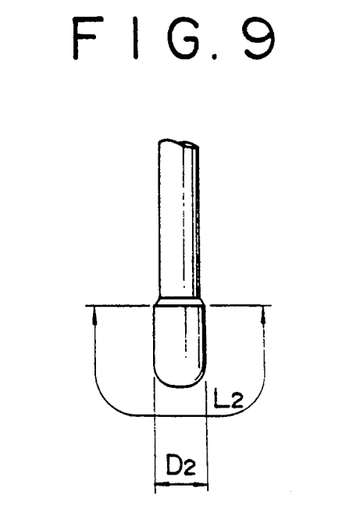
FIG. 9 is an enlarged front view of the distal bulged end of the stretching rod shown in FIG. 1.

As shown in FIG. 8A, the preform 10 is of a simple configuration with the barrel portion 16 having a substantially uniform wall thickness in the axial direction without any rapid transition. Therefore, the preform 10 can be injection molded into a hollow article in the same manner as in the conventional injection molding process.

Temperature Regulating Step for Preform 10

In the temperature regulating step, the region of the preform 10 below the shoulder portion 14 is enclosed by the temperature regulating pot and the temperature regulating core is inserted into the interior of the preform 10. The distribution of temperature in the preform 10 suitable for molding the bottle 20 is generally established so that the temperature of the shoulder portion 14 is higher than that of the bottom portion 18. Since the preform 10 of this embodiment has the barrel portion 16 having its substantially uniform wall thickness in the axial direction, the above distribution of temperature can be easily accomplished by independently controlling the respective zones of the temperature regulating pot with respect to temperature.

Temperature Regulating Step for Bottom Portion 18

Figure 2:
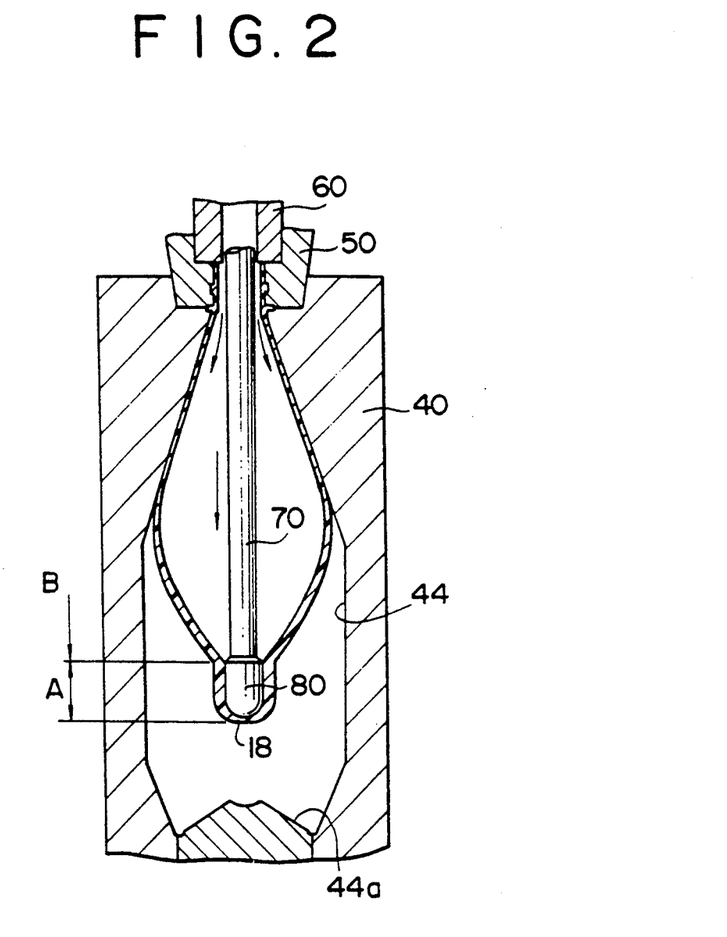
FIG. 2 is an enlarged cross-sectional view illustrating the intermediate stretching step which includes the longitudinal stretching operation and the introduction of primary blow air.

After temperature regulation, the preform 10 is moved to the biaxially stretch blow molding stage shown in FIG. 2 by the neck mold 50. After the preform 16 has been positively clamped as shown in FIG. 1, the bottom portion 18 of the preform 10 is locally regulated in temperature. For such a purpose, the stretching rod 70 is excessively moved a given distance (e.g. 2 mm to 5 mm) after it has reached the inner bottom wall of the preform 10. This reduces the inner diameter of the bottom preform portion 18 to bring the bulged end portion 80 of the stretching rod 70 into close contact with the inner wall of the bottom preform portion 18. Temperature regulating water is introduced into the annular passage between the outer and inner tubes 72, 74 of the stretching rod 70 and circulated from the bulged end portion 80 through the inner tube 74 to the outlet 78. When the temperature of the water is controlled, the temperature of the bulged end portion 80 can be also controlled into a predetermined level. The temperature of the bulged end portion 80 may be established such that a region A of the preform 10 contacting the bulged end portion 80 shown in FIG. 1 (which will be referred to "contact region") is lower in temperature than the upper non-contact region B of the preform 10 non-contacting the bulged end portion (which will be referred to "non-contact region"). In this embodiment, the temperature of the contact region A is the same as that of the zone of the temperature regulating pot corresponding to the bottom preform portion 18 in the temperature regulating step after the injection molding step. Such a temperature is required to be set such that the contact region A of the bottom preform portion 18 will be less stretched than the upper non-contact region B by the longitudinal motion of the stretching rod 70 and the introduction of primary air. More particularly, the temperature is preferably set within a range between 30 degrees C. and 80 degrees C. and more preferably within between 60 degrees C. and 70 degrees C. If the temperature is lower than the range, it becomes difficult to stretch the preform 10 with penetration of the stretching rod 70. If the temperature is higher than the range, the preform 10 may be undesirably stretched so as not to provide a desired thick-walled portion. The time period required to locally regulate the temperature of the bottom preform portion 18 is preferably ranged between 5 seconds and 8 seconds, including the time period required to clamp the mold assembly, more preferably between 7 seconds and 8 seconds. It has been found that such a setting of time period can regulate the temperature of the bottom preform portion 18 into a level suitable for stretching. It is noted that the biaxial stretch blow molding step requires an amount of time increased by the temperature regulating cycle, compared with the prior art. However, the hot parison system determines the circulating cycle through the respective steps (that is, molding cycle) in accordance with the injection molding step which requires the maximum time period among all steps. The above increase of time period will not extend the molding cycle.

The temperature regulating step maintains the temperature of the preform contact region A at a level sufficiently lower than that of the upper preform non-contact region B, with the boundary region therebetween having a definite temperature gradient.

Biaxially Stretch Blow Molding Step

Longitudinal Stretch + Introduction of Primary Air

After the bottom preform 18 has been locally regulated in temperature, the stretching rod 70 begins to be moved in the longitudinal direction. After passage given time period, the primary air is introduced into the interior of the preform 10 through the blow core 60. The bottom contact region A contacting the bulged portion 80 will be moved downwardly while being in close contact with the bulged end portion 80. However, the bottom contact region A is hardly stretched since the potential temperature thereof is lower than that of the non-contact region B non-contacting the bulged end portion 80. Thus, the longitudinal motion of the stretching rod 70 will be substantially consumed to stretch the non-contact region B in the longitudinal direction. Since the contact region A is in close contact with the bulged end portion 80, the primary air having a relatively low pressure will be hardly blown into the bottom contact region A to stretch it in the transverse direction. In such a manner, the regions of the preform 10 other than the contact region A contacting the bulged end portion 80 will be exclusively stretched in both the longitudinal and transverse directions such that the stretch of the preform 10 proceeds in such a manner as shown in FIG. 2.

Figure 3:
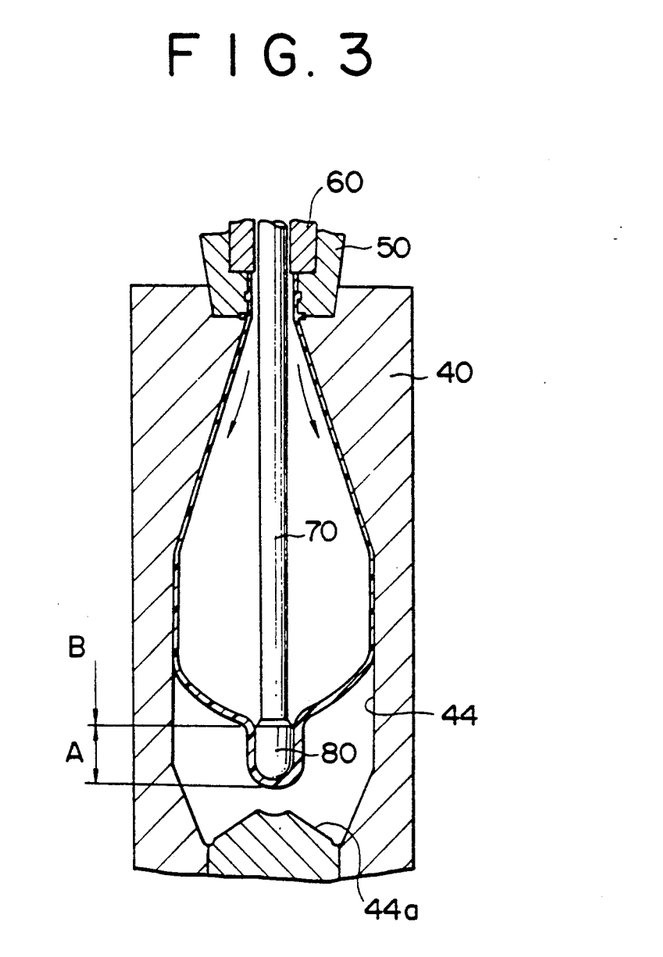
FIG. 3 is an enlarged cross-sectional view illustrating the stretching step proceeded from the step of FIG. 2.

FIG. 3 shows a state in which the stretching step further proceeds from the state of FIG. 2. In such a state of FIG. 3, the longitudinal and transverse stretchings are similarly made in the region of the preform 10 other than the contact region A. As the stretching step proceeds, the preform sections will be brought into contact with the inner cavity wall 44 of the blow cavity mold 40 sequentially from the top region to the bottom region.

Figure 4:
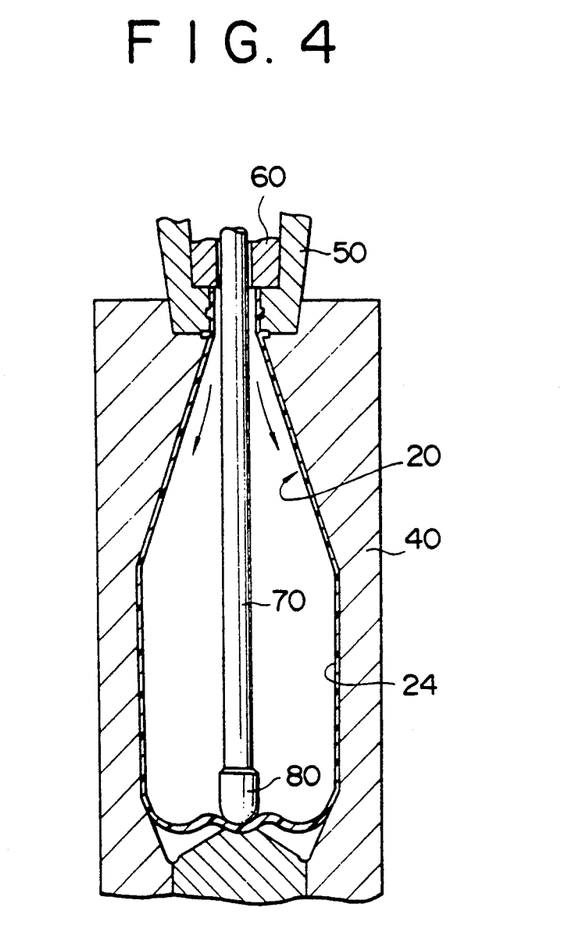
FIG. 4 is an enlarged cross-sectional view illustrating the state immediately before the secondary blow air is introduced into the interior of the preform in place of the primary blow air.

When the distal bulged end of the stretching rod 70 reaches its lowermost position, it is believed that the stretched state of FIG. 4 is attained. More particularly, the preform contact region A is sequentially released from the upper side wall of the bulged end portion 80. In such a state, it is believed that the contact region corresponds to the side bottom wall of the bulged end portion 80. However, the non-contact region of the bottom bottle portion is still maintained thick-walled due to the difficulty for stretching. The other region above the non-contact region will be shaped into contact with the inner cavity wall 44 of the blow cavity mold 40. The state of FIG. 4 is at the passage of, for example, one second from the start of the longitudinal stretching step. Immediately after the state of FIG. 4, the secondary air is introduced into the interior of the preform.

In order to ensure the aforementioned operation, it is desirable that the primary air has a pressure equal to or less than 15 kg/cm$^2$, the pressure being selected from a range between 5 kg/cm$^2$ and 15 kg/cm$^2$, depending on the rate of transverse stretching and the other factors.

Fixation of Shape by Introduction of Secondary Air

Figure 5:
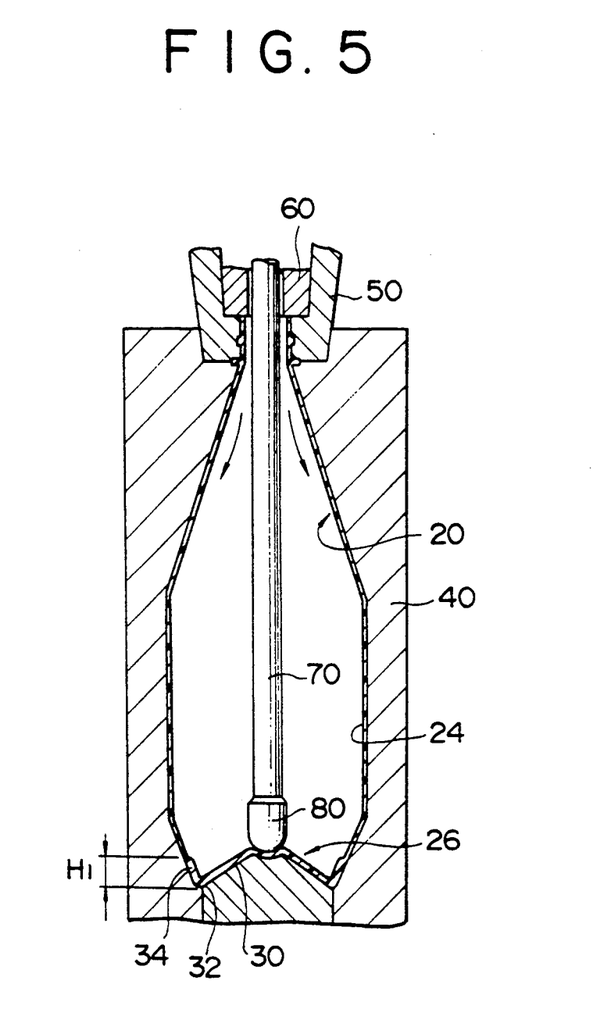
FIG. 5 is an enlarged cross-sectional view illustrating the final state wherein the preform has been molded by the introduction of the secondary blow air.

After or immediately before arrival of the stretching rod 70 at its lowermost position, the air inlet port 66 is connected to the source of secondary air. The secondary air will be introduced into the interior of the preform 10 through the blow core 60. The secondary air has a pressure higher than that of the primary air and preferably ranged between 15 kg/cm$^2$ and 40 kg/cm$^2$. As a result, the bottom portion 18 of the preform 10 is stretched into close contact with the inner bottom wall 44a of the blow cavity mold 40. Since the bottom portion 18 of the preform 10 maintains relatively thick-walled immediately before the introduction of the secondary air, the bottom portion 26 of the bottle 20 can have its wall thickness larger than that of the barrel portion 24 even after the preform has been stretched by the introduction of the secondary air, as shown in FIG. 5. The fixation of shape in the entire bottle 20 can be realized by the introduction of the secondary air having its higher pressure.

Figure 8B:
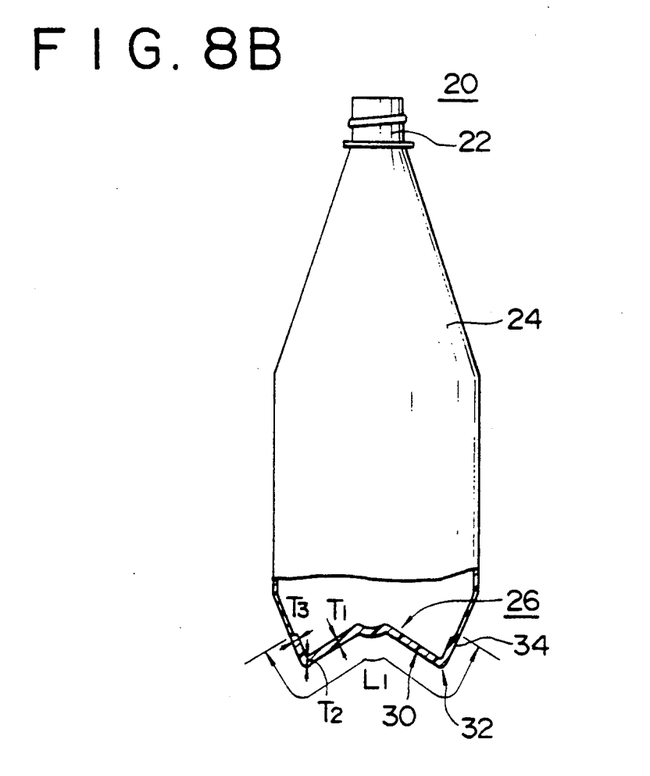
FIG. 8B is a schematic cross-section of a bottle molded by the apparatus of FIG. 1.

After the bottle 20 has been molded, the respective wall thicknesses $T_1$ through $T_3$ in the bottom portion 26 of the bottle 20 shown in FIG. 8B were measured:

$T_1 = 3.5$ mm–3.7 mm;

$T_2 = 2.0$ mm–2.2 mm; and $T_3 = 1.7$ mm–1.9 mm.

Resulting from the fact that the slope wall part 30, self-standing bottom ring part 32 and lower side barrel wall 34 in the bottom region 26 of the bottle 20 had the respective wall thicknesses mentioned above, various problems such as cracking, crazing, outwardly distortion of the champagne's bottle bottom and so on could be reliably avoided even though such bottles 20 were used as R-R bottles or pressure vessels subjected to the internal pressure from carbonated beverages. The fact that the bottom portion 18 of the preform 10 is stretched to overlay the inwardly convex cavity surface 44a of the bottom cavity portion by the introduction of secondary air can reduce the residual stress to increase the mechanical strength of the bottle. Since the self-standing bottom ring part 32 can be thick-walled, it can be molded into a uniform wall thickness, which would be difficult to mold so. In addition, the expanded length $L_1$ of the thick-walled region can be controlled by the expanded length $L_2$ of the bulged end portion 80 corresponding thereto. Therefore, the present invention can greatly reduce the manufacturing cost since the work can be extremely simplified, compared with the prior art wherein the wall thickness of the preform is regulated by shaping and working the injection mold to control the range of wall thickness in the bottom portion of the final product.

In this embodiment, various timings for the longitudinal movement and speed of the stretching rod 70 and shifting between the primary and secondary air sources can be adjusted. Particularly, if the timing for shifting between the primary and secondary air sources is variable, it was found that the following function could be realized.

Figure 6:
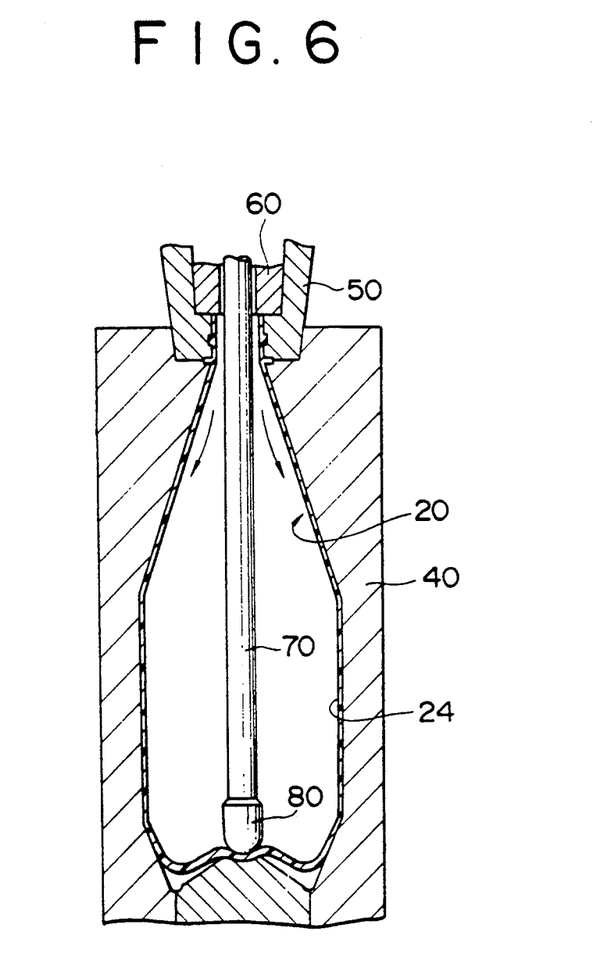
FIG. 6 is an enlarged cross-sectional view illustrating the state when the secondary blow air is introduced into the interior of the preform at a timing delayed from that of FIG. 4.
Figure 7:
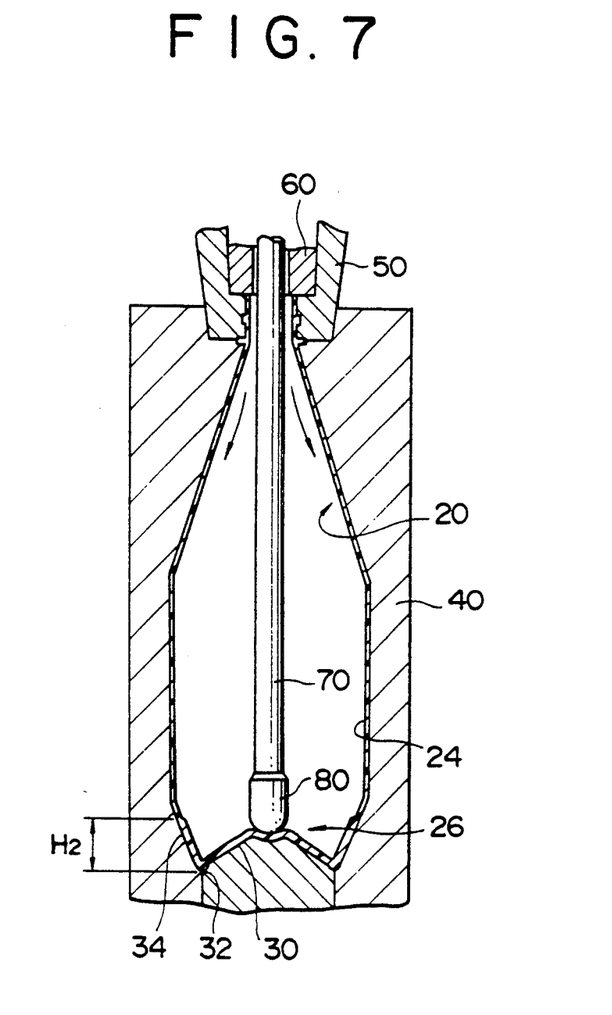
FIG. 7 is an enlarged cross-sectional view illustrating the final product molded by the stretching step shown in FIG. 6.

FIGS. 6 and 7 show states wherein the preform is stretched at two different timings of secondary air introduction delayed from the states of FIGS. 4 and 5, respectively. FIG. 6 illustrates a state wherein the preform is stretched by the secondary air introduced after the passage of two seconds from the start of the longitudinal stretching step. It is understood that in such a state, the bottom area of the bottle 20 more than that of FIG. 4 are contacted by the inner cavity wall 44 of the blow cavity mold 40. FIG. 7 illustrates the shape of the final product obtained by the introduction of secondary air after the state of FIG. 6 has been obtained. This is different from the state of FIG. 5 in that the height $H_2$ of the side thick-walled portion in FIG. 7 is higher than the height $H_1$ of the side thick-walled portion 34 in the bottom portion shown in FIG. 5. In other words, the delay of timing in introducing the secondary air can ensure that the desirable height of the side thick-walled part of the bottom bottle portion 26 is provided. In such a case, the entire wall thickness of the side bottom thick-walled portion 34 in the bottom portion 26 of the bottle shown in FIG. 7 becomes somewhat smaller than that of the bottom portion 26 of the bottle 20 shown in FIG. 5. However, cracking, which tends to be created in such a region, can be prevented by increasing the height $H_2$.

Thus, the present embodiment is advantageous in that the wall thickness and shape of the final product or bottle 20 at its bottom portion 26 can be easily controlled by changing the timing of secondary air introduction other than changing the shape of the bulged end portion 80 which is very difficult to modify mechanically. Such a control may be carried out also by regulating the pressure of the secondary blow air and the temperature of the bulged end portion 80.

COMPARATIVE EXAMPLE

When a conventional stretching rod was used without any circulation of temperature regulating water therethrough, a bottle so obtained had the following wall thicknesses $T_1$ through $T_3$ at the respective bottom regions in the bottom portion thereof, as measured in the same manner:

$T_1 = 3.5$ mm;

$T_2 = 1.2$ mm; and $T_3 = 1.0$ mm.

These wall thicknesses cannot provide such a mechanical strength as required in using the bottle as an R-R bottle or pressure vessel.

Figure 11:
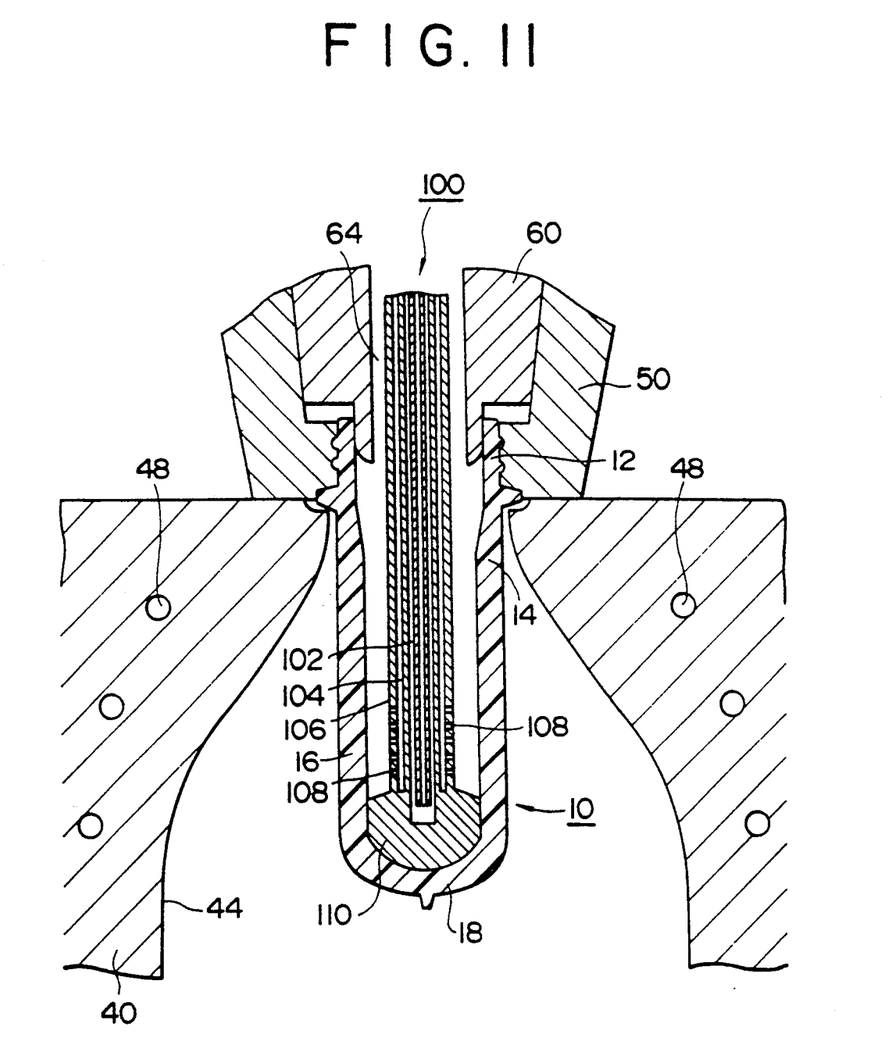
FIG. 11 is a schematic cross-section of still another embodiment of the present invention in which a bottle is heat set by using a blow cavity mold which includes heating means contained therein.

FIG. 11 shows another embodiment of the present invention in which a blow cavity mold 40 includes internal heating means such as a water jacket 48 located therein. The water jacket 48 can heat the inner cavity wall 44 into a given level. After a bottle has been biaxially oriented within the blow cavity mold 40 and placed in contact with the inner cavity wall 44 thereof, the bottle can be heat set within the blow cavity mold 40.

Before the heat set bottle is removed from the blow cavity mold 40, a cooling gas may be introduced into the interior of the bottle through a stretching rod to cool the bottle. The illustrated stretching rod 100 is of a concentrical triple-tube structure which is connected, at its distal end, to a bulged portion 110. The stretching rod 100 comprises a first or central tube 102 for conducting the temperature regulating water into the bulged portion 110; a second or intermediate tube 104 for exhausting the temperature regulating water from the bulged portion 110; and a third or outer tube 106 for introducing a cooling medium into the interior of the bottle through a discharge port 108 which is formed in the third tube 106 at a position adjacent the bulged portion 110. The introduction of the cooling medium is carried out to cool the bottle after the heat setting step. The cooling medium may be air at room temperature or liquid nitrogen.

The biaxially stretch blow molding step in this embodiment is carried out in the same manner as in the previously described embodiment, until the introduction of secondary air. As the bottle is shaped into contact with the inner cavity wall 44, the bottle is heat set since the inner cavity wall 44 is heated. After the heat setting step is continued for a given time period, the air passage 64 of the blow core mold 60 is connected to the exhaust passage and also the cooling air is introduced into the third tube 106 of the stretching rod 100. The cooling air is then blown into the interior of the bottle through the discharge port 108 to cool the bottle and is exhausted through the air passage 64. After the bottle cooling step has been performed for a given time period, the supply of the cooling air is stopped and the interior of the bottle is connected to the exhaust passage through the air passage 64. Thereafter, the mold assembly is opened such that the bottle can be removed from the blow cavity mold 50.

When the heat set bottle was removed from the blow cavity mold after the cooling step, the heat shrinkage of the bottle on removing from the blow cavity mold could be prevented. It was further found that the heat setting step and the cooling step are extremely effective, particularly, on molding R-R bottles. When collected, the used R-R bottles were normally washed by the use of alkaline solution at a raised temperature. This results in heat distortion of the R-R bottles. The inventor regulated the temperature of the blow cavity mold 40 to a temperature of 110 degrees C. and cooled the bottle for 17 seconds after the introduction of air was continued for 17 seconds and before the bottle was removed from the blow cavity mold. The dipping of the resulting bottle in a liquid of 58 degrees C. for 14 minutes was repeated twenty times. When the volume shrinkage of the bottle was measured, the inventor found an excellent result that the volume shrinkage was equal to or less than 2%.

It is to be understood that the present invention is not limited to the aforementioned embodiments and may be carried out in the various modified and changed forms without departing from the scope of the invention.

Figure 10A:
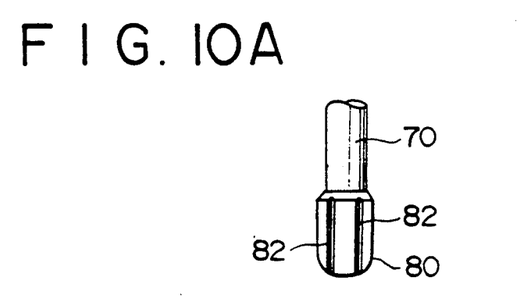
FIGS. 10A and 10B are front and bottom views illustrating another embodiment of the present invention in which the bulged end of the stretching rod includes air escaping channels formed therein.
Figure 10B:
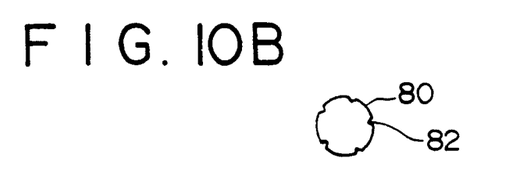

As shown in FIGS. 10A and 10B, for example, the present invention may be applied to a modification wherein the distal bulged end portion 80 of the stretching rod 70 includes a plurality of air escaping channels 82 formed on the outer wall thereof to extend from the top end to the bottom end of the bulged end portion 80. When the bulged portion 80 is moved into close contact with the inner bottom wall 18 of the preform 10, air will not be accumulated between the distal end of the bulged portion 80 and the bottom wall of the preform 10 since the air can escape outwardly through the air escaping channels 82. This realizes the reliable movement of the bulged portion 80 into close contact with the inner bottom wall 18. In place of the circulation of temperature regulating medium through the stretching rod 70, only the bulged portion 80 may be temperature regulated by a heater or other radiant means during a relatively long standby cycle after the stretching rod 70 is drawn out of the preform 10.

The hollow article to which the present invention can be applied is not limited to a champagne bottle as in the aforementioned embodiments and may be similarly applied to various processes for molding any other hollow articles having a relatively thick bottom wall. As described, the process of the present invention has been described with respect to a preform of relatively simple structure which includes a barrel portion having a substantially uniform wall thickness in the axial direction. However, the present invention may be applied to various configurations of preform.

I claim:

1. A process of injection stretch blow molding a hollow article having a thick-walled bottom region, comprising the steps of:
   injection molding a preform in the form of a closed-end cylinder in an injection molding station;
   moving said preform to a blow molding station wherein said preform is placed within a blow cavity mold while said preform still retains heat provided thereto by the injection molding step;
   thereafter, inserting a stretching rod into said preform and moving said stretching rod so that a distal bulged end portion of said rod reaches and contacts the inner bottom wall and side wall portions of said preform corresponding to the thick walled bottom region of said hollow article;
   regulating the temperature of the distal bulged end portion of the stretching rod inserted into said preform and, prior to initiation of blow molding, maintaining said distal bulged end portion in contact with said inner bottom wall and side wall portions of said preform corresponding to the thick-walled bottom region of said hollow article thereby regulating the temperature at the inner bottom and side wall portions of the preform contacting with said distal bulged end portion to a temperature which is lower than the temperature of another portion of said preform; and
   biaxially stretch blow molding said preform into said hollow article by blowing a pressurized fluid into said preform and also by driving said stretching rod.

2. A process as defined in claim 1 wherein after said stretching rod is moved into contact with the inner bottom wall and side wall portions of said preform, said stretching rod is further moved a given distance in the longitudinal direction to bring the outer wall of said bulged portion into close contact with said inner bottom wall and side wall portions of said preform and wherein after the further movement of said stretching rod, said stretching rod is stopped thereat for a given time period to regulate the temperature of said bottom wall and sidewall portions of said preform before said preform is stretched by said stretching rod in the longitudinal direction.

3. A process as defined in claim 1 wherein the distal bulged end portion of said stretching rod includes air escaping channel means formed therein at an outer wall to extend from a top end to a bottom end of said bulged end portion and wherein air caught between the distal end of the bulged portion and the inner bottom wall of said preform can escape through said air escaping channel means to regulate the temperature of the bottom wall and side wall portion of said preform.

4. A process as defined in claim 1 wherein said temperature regulating step is performed while circulating a temperature regulating medium through said stretching rod.

5. A process as defined in claim 1 wherein said injection molding step forms said preform with a cylindrical barrel portion thereof having a substantially uniform wall thickness in an axial direction.

6. A process as defined in claim 1 wherein a temperature regulating station is located between said injection molding station and said blow molding station and wherein said temperature regulating station provides, to said preform, an axial distribution of temperature in which a region of said preform below a neck portion is higher in temperature than the bottom wall portion.

7. A process as defined in claim 1 wherein said biaxially stretch blow molding step comprises the steps of:
   longitudinally moving said stretching rod to longitudinally stretch said preform while said bulged portion is maintained in contact with the inner bottom wall and side wall portions of said preform from the beginning of the longitudinal stretching step to immediately before the end of the longitudinal stretching step;
   introducing a primary blow air into an interior of said preform at the same time as the longitudinal stretching step to transversely stretch in order to shape said preform into said hollow article except the bottom and side wall portions contacting said bulged portion; and
   thereafter introducing a secondary blow air into the interior of said preform, said secondary blow air having a pressure higher than that of said primary blow air to stretch the bottom and side wall portions of said preform into engagement with an inner cavity surface of said blow cavity mold to mold said hollow article.

8. A process as defined in claim 7 wherein after said stretching rod is moved into contact with the inner bottom wall of said preform, said stretching rod is further moved a given distance in the longitudinal direction to bring an outer wall of said bulged portion into close contact with said inner bottom wall and side wall portions of said preform and wherein the further longitudinal movement of said stretching rod is stopped for a given time period to regulate the temperature of said bottom wall and side wall portions of said preform before said preform begins to be stretched by said stretching rod in the longitudinal direction.

9. A process as defined in claim 7 wherein the distal bulged end portion of said stretching rod includes air escaping channel means formed on the outer wall thereof to extend from a top end to a bottom end of said bulged end portion, whereby air caught between the distal end of said bulged end portion and the inner bottom wall of said preform can escape through said air escaping channel means to regulate the temperature of the bottom and side wall portions of said preform.

10. A process as defined in claim 7 wherein said injection molding step forms said preform to have a cylindrical barrel portion which is substantially uniform in wall thickness along the longitudinal axis thereof.

11. A process as defined in claim 7 wherein a temperature regulating station is located between said injection molding station and said blow molding station and wherein said temperature regulating station provides, to said preform, an axial distribution of temperature in which a region of said preform below a neck portion is higher in temperature than the bottom wall and side wall portions.

12. A process as defined in claim 7 wherein a temperature regulating medium is circulated through said stretching rod to regulate the temperature of the bottom wall and side wall portions of said preform.

13. A process as defined in claim 1 wherein said blow cavity mold includes heater means for heating an inner cavity wall thereof and wherein said process further comprises the step of heat setting said hollow article in contact with the inner cavity wall of said blow cavity mold.

14. A process as defined in claim 13, further comprising the step of introducing a cooling medium into the interior of said hollow article through said stretching rod to cool said hollow article after said heat setting step has terminated and before opening of the blow cavity mold.

15. A process as defined in claim 14 wherein said stretching rod is of a multi-tube structure including a central tube for receiving a temperature regulating medium to be circulated through said bulged end portion and an outer tube for receiving said cooling medium.

16. A process as defined in claim 13 wherein said hollow article is of a refillable and returnable bottle type.

17. A process as defined in claim 7 wherein said blow cavity mold includes heater means for heating an inner cavity wall thereof and wherein said process further comprises the step of heat setting said hollow article in contact with the inner cavity surface of said blow cavity mold.

18. A process as defined in claim 17, further comprising an step of introducing a cooling medium into the interior of said hollow article through said stretching rod to cool said hollow article after said heat setting step has terminated and before opening of the blow cavity mold.

19. A process as defined in claim 18 wherein said stretching rod is of a multi-tube structure including a central tube for receiving a temperature regulating medium to be circulated through said bulged end portion and an outer tube for receiving said cooling medium.

20. A process as defined in claim 17 wherein said hollow article is of a refillable and returnable bottle type.

21. A process as defined in claim 1 wherein said distal bulged end portion has a cylindrical surface being in contact with the inner side wall adjacent to the inner bottom wall of said preform.

* * * * *